July 8, 1924.
J. A. CHAMBERS
1,500,547
SYSTEM OF AND APPARATUS FOR RETAILING LIQUIDS
Filed June 12, 1922      4 Sheets-Sheet 3
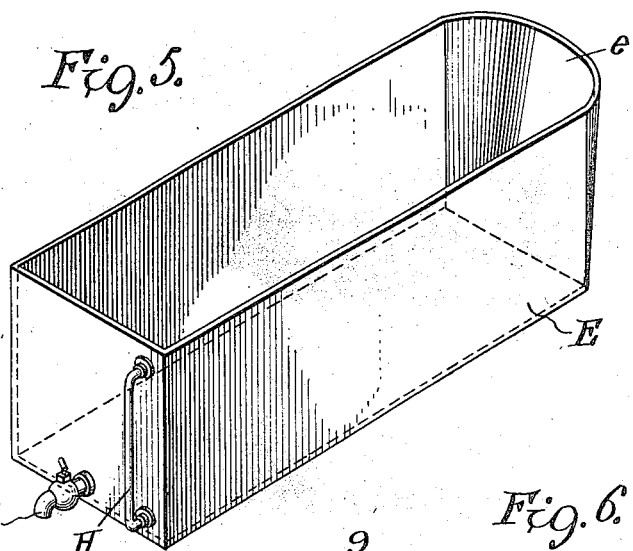
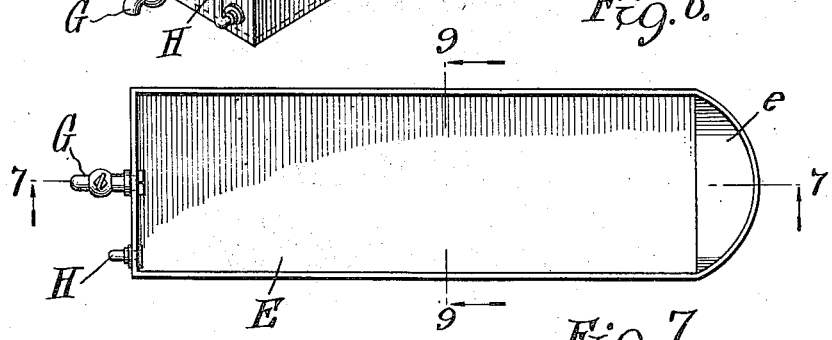
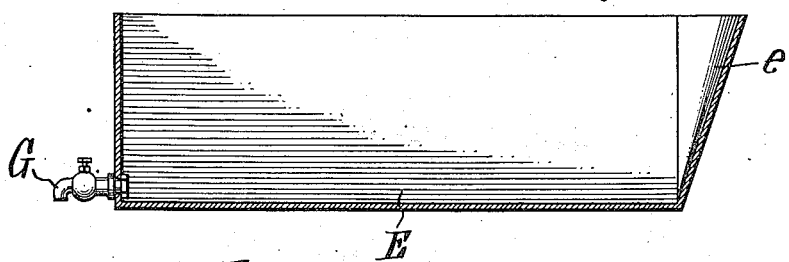
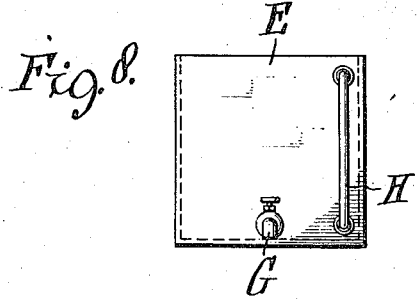
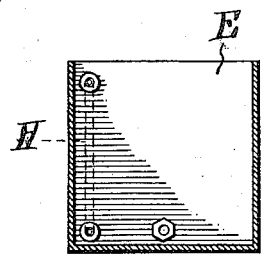
Inventor
J. A. Chambers
by Wilkinson &
Giusta
Attorneys July 8, 1924.
J. A. CHAMBERS
SYSTEM OF AND APPARATUS FOR RETAILING LIQUIDS
Filed June 12, 1922 4 Sheets-Sheet 4
1,500,547
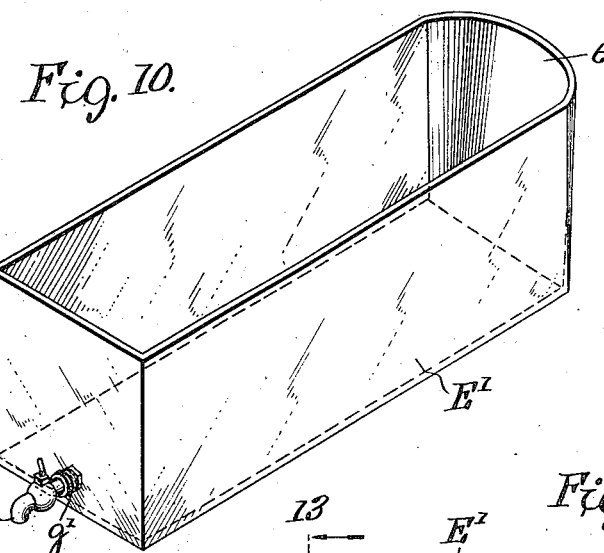
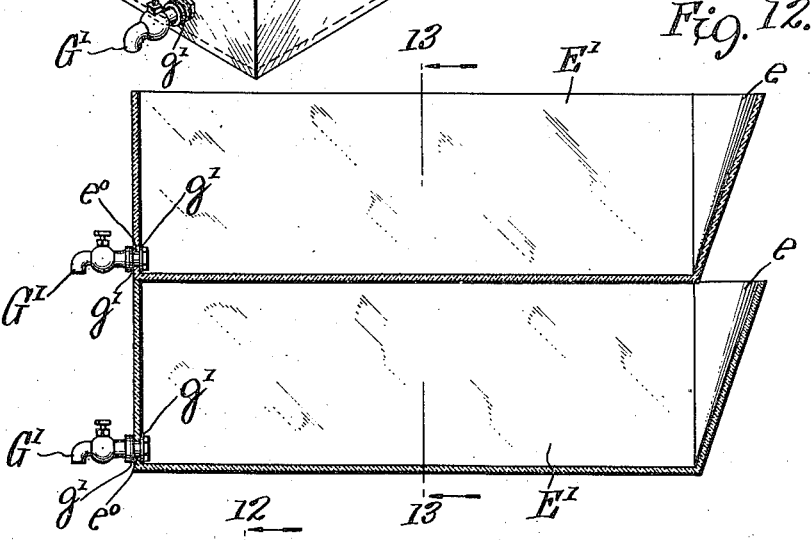
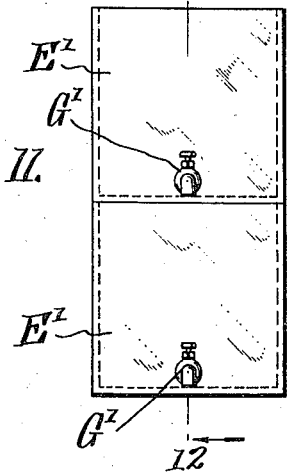
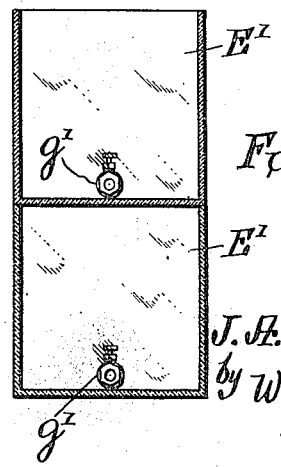
Inventor
J. A. Chambers
by Wilkinson &
Giusta
Attorneys.

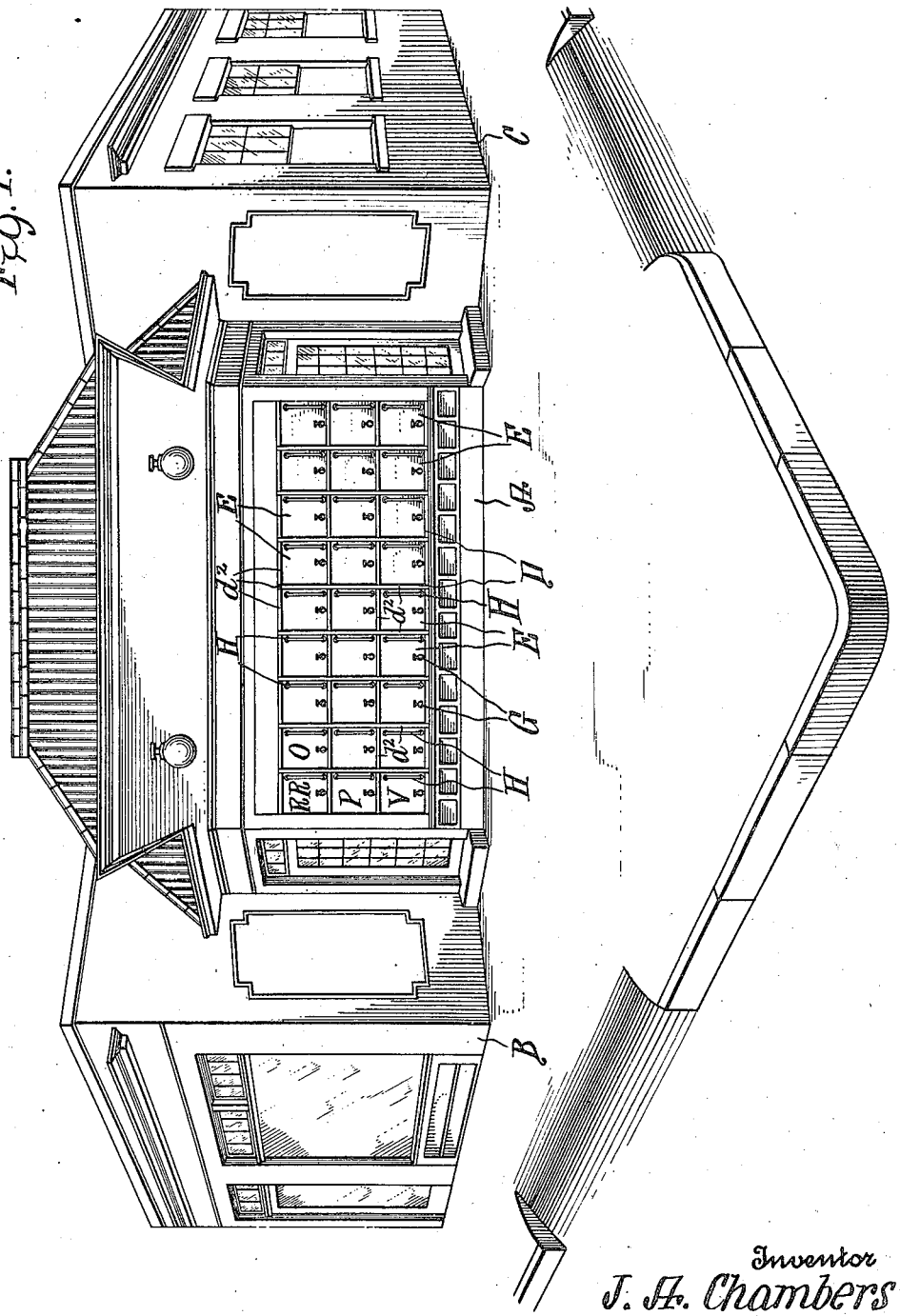

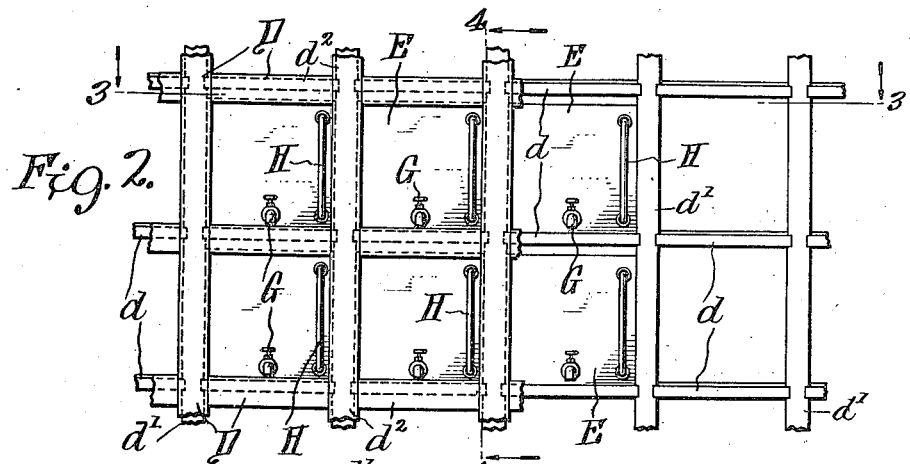
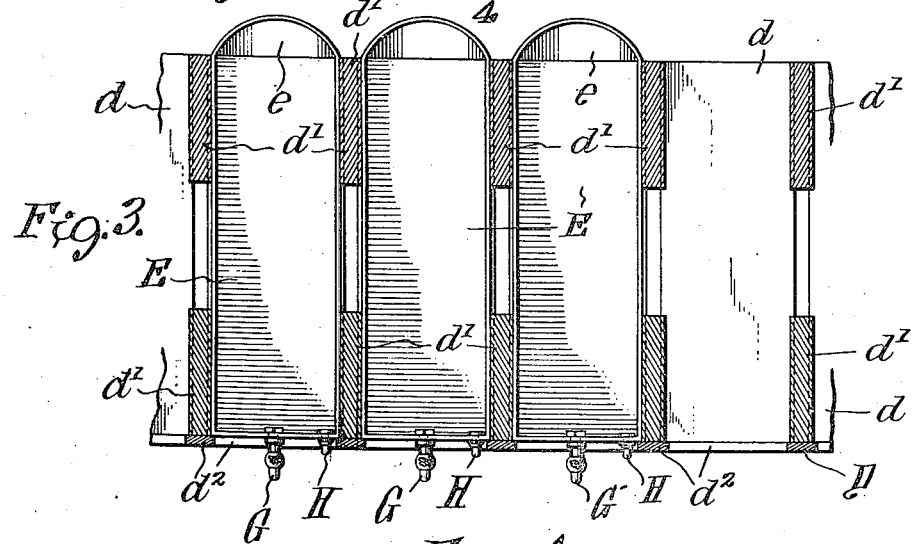
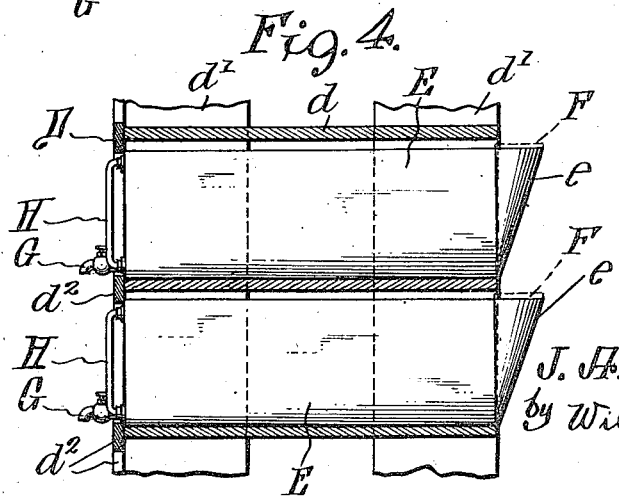

Patented July 8, 1924.

1,500,547

UNITED STATES PATENT OFFICE.

JOSEPH ANDREW CHAMBERS, OF NEW ORLEANS, LOUISIANA.

SYSTEM OF AND APPARATUS FOR RETAILING LIQUIDS.

Application filed June 12, 1922. Serial No. 567,834.

*To all whom it may concern:*

Be it known that I, JOSEPH ANDREW CHAMBERS, a citizen of the United States, residing at New Orleans, in the parish of Orleans and State of Louisiana, have invented certain new and useful Improvements in Systems of and Apparatus for Retailing Liquids; and I do hereby declare the following to be a full, clear, and exact description of the invention, such as will enable others skilled in the art to which it appertains to make and use the same.

My invention relates to improvements in systems of and apparatus for retailing liquids, and while it is especially intended for retailing lubricant of various kinds for use with the various makes of automobiles, it is capable of being used in various other relations where different kinds and qualities of liquids are to be drawn off and sold in limited quantities.

Since the invention is especially adapted to the sale of lubricants for use with the various makes of automobiles, the embodiment of the invention adapted for this use will be hereinafter particularly described and claimed.

It is well known that the manufacturers, or users of the various types of automobiles, prefer, or pretend to prefer, a special quality or make of lubricant, and this fact or fancy, as the case may be, has to be considered in the vending of such lubricant to the driver of the car.

My present invention is intended to provide an arrangement by which the containers having the various qualities of lubricant are clearly marked, and are marked in such a way as may be visible to the driver of the car without his being obliged to get out and inspect the source of supply. Moreover it is especially desirable that the liquid supply may be drawn off in sight of the driver of the car, and from the proper receptacle. I, therefore, provide a series of receptacles, preferably symmetrically disposed, each plainly marked to indicate the contents thereof, and each made either translucent or provided with a transparent gage to show the color as well as the depth of the lubricant in the container.

I also provide means for drawing off the liquid from the front of the receptacle in the plain sight of the purchaser, who may remain in his car while the liquid is being supplied to him.

My invention will be more fully understood after reference to the accompanying drawings, in which like parts are indicated by similar reference symbols throughout the several views, and in which—

Figure 1 is a front view of a supply station for automobile supplies with my improved arrangement for dispensing lubricant shown in elevation in the center thereof.

Figure 2 is a fragmentary view, on a larger scale, of a number of the containers in superposed relation as shown in Fig. 1.

Figure 3 shows a section along the line 3—3, of Fig. 2, and looking in the direction of the arrows.

Figure 4 shows a section along the line 4—4 of Fig. 2, and looking in the direction of the arrows.

Figure 5 is a perspective view of one of the containers shown in Figs. 1 to 4.

Figure 6 is a plan view of the container shown in Fig, 5.

Figure 7 shows a longitudinal section along the line 7—7 of Fig. 6, and looking in the direction of the arrows.

Figure 8 shows a front view of the container shown in Figs. 5 to 7.

Figure 9 shows a section along the line 9—9 of Fig. 6, and looking in the direction of the arrows.

The containers above shown are all indicated as made of metal with a glass gage. The containers shown in Figs. 10 to 13 are indicated as made of glass.

Figure 10 shows a glass container in perspective.

Figure 11 shows two of the glass containers in the superimposed relation.

Figure 12 shows a section along the line 12—12 of Fig. 11, and looking in the direction of the arrows; and Figure 13 shows a section along the line 13—13 of Fig. 12, and looking in the direction of the arrows.

Referring to Figure 1, this shows an automobile supply station having a central structure A from which the lubricants may be vended, and two adjacent buildings B and C from which other supplies may be vended; but my present invention relates especially to the contents of the building A.

In this building I provide a suitable framework D, which is shown in detail in Fig. 2. This framework consists of a series of shelves $d$, which are preferably inclined slightly forwards, as shown in Figs. 2 and 4, so that the contents of the receptacles placed thereon will tend to drain forward. These shelves are supported by the uprights $d^1$ and form therewith a series of rectangular compartments, like pigeon-holes, into which the containers are slid. The front of the frame is covered with broader strips $d^2$, which may be made ornamental, and serve not only to mask the spaces around the containers and make an attractive appearance, but also serve as stops to limit the forward movement of the containers when they are slid forward on their racks.

The containers E are preferably shaped somewhat like a bathtub, with rounded overhanging portions $e$, projecting beyond the rear edge of the corresponding shelves, so that the container may be filled from the rear by pouring in from another vessel, or inserting a hose, without withdrawing the same from the assembled relation on the rack. These projecting portions are shown in Fig. 4, and may be provided with suitable covers F, as indicated in dotted lines in Fig. 4, to keep out dust or other foreign matter. The containers are provided at their forward ends with suitable draw cocks G; and if made of metal should be provided with transparent glass gages H, as shown in Figs. 1 to 9. If desired the containers may be made of glass, as indicated at $E^1$ in Figs. 10 to 13, in which case the glass gages may be dispensed with, and the height of the liquid and the color of the liquid may be seen from the front of the dispensing station.

The containers, if made of glass, may be provided with holes $e^0$ in which is mounted the stem of the draw cock $G^1$, suitable washers $g^1$ being provided; or the liquid may be drawn from the glass containers by siphons, or in any other convenient way.

While with a large establishment dispensing a number of different kinds of liquids, the frames, such as D, having compartments or racks on which the containers may be slid, should preferably be provided, it will be obvious that the containers may be mounted one upon the other without the interposition of any racks, as shown in Figs. 11 to 13, in which case the projecting rear portion $e$ of each container will facilitate the filling of the same from the rear without removing the container itself.

When it is desired to remove the containers for purposes of cleansing, or repairing same, or for any other reason, each container may be simply slid to the rear and removed, and then put back in place when desired, or a new container substituted therefor.

It is intended to provide these containers of standard sizes and makes so that they may be kept in stock at some central supply station and readily supplied to the various stations where needed.

By having the containers slope slightly forward when in the assembled relation, as shown in Fig. 4, the tendency of the liquid therein will be to run forward so that each container may be thoroughly drained of its contents; but this feature is not of special importance where the sales are rapid and the containers are being refilled frequently. Therefore the containers may be placed on the level if desired. Moreover, special drain gutters (not shown) may be provided in the bottom of the containers if desired.

It will be noted that the draw cock and liquid gage when used will pass clear of the framework when the container is inserted or removed, as shown most clearly in Fig. 2.

In order to guide the purchaser, as well as the vendor, in the liquid which is to be dispensed, the various containers may be specially marked. For instance, the containers may be marked for use with well known makes of automobiles, such as shown in Fig. 1, "R. R." for Rolls Royce, "P" for Packard, "V" for Velie, "O" for Overland, etc.

It will be obvious that other liquids may be identified and dispensed in a similar way from individual containers.

In operation, suppose the driver of a Rolls Royce machine wishes to purchase the lubricant for use in his automobile, he drives up in front of the distributing station and sees that the vender supplies him with the liquid out of the container marked "R. R."

While the invention is especially adapted for use in connection with the vending of liquid lubricants for use with automobiles, it will be obvious that it may be used also in vending liquids of other kinds, such as different grades of syrups or molasses.

It will also be obvious that the invention may be used for various other purposes, and I do not mean to limit the invention to the particular uses shown.

It will also be obvious that various changes in the construction, combination and arrangement of parts might be made which could be used without departing from the spirit of my invention; and I do not mean to limit the invention to such details except as particularly pointed out in the claims.

Having thus described my invention, what I claim and desire to secure by Letters Patent of the United States is:—

1. A vending station for liquids comprising a cabinet arranged with its outer face exposed to view of motorists entering the station, a plurality of containers mounted in the cabinet with their forward ends exposed through the front face of the cabinet, individual means for each container at the forward end thereof for drawing off quantities of different fluids disposed in the separate containers, and means at the inner end of each container for refilling the same without removing the containers from the cabinet and without disturbing the interrelation of the containers.

2. In a liquid vending station, rows of independent containers adapted to receive liquids of different kinds and different grades, a cabinet supporting said containers with the outer ends of the containers exposed through the front face of the cabinet and said cabinet being arranged with its front face exposed to view of motorists approaching the cabinet, individual means on said containers at the inner ends thereof for individually refilling the same, transparent gages mounted upon the front ends of the containers for exposing a portion of the contents thereof to view at the front of the cabinet, and means for individually withdrawing quantities of liquid from the different containers as selected by the motorists viewing the front of the cabinet.

JOSEPH ANDREW CHAMBERS.